United States Patent [19]

Heise

[11] Patent Number: 4,699,050

[45] Date of Patent: Oct. 13, 1987

[54] CALENDER ROLLER MOUNTING ARRANGEMENT

[75] Inventor: Wolfgang Heise, Hanover, Fed. Rep. of Germany

[73] Assignee: Hermann Berstorff Maschinenbau GmbH, Hanover, Fed. Rep. of Germany

[21] Appl. No.: 838,621

[22] Filed: Mar. 11, 1986

[30] Foreign Application Priority Data

Mar. 13, 1985 [DE] Fed. Rep. of Germany ....... 3508847

[51] Int. Cl.$^4$ .............................................. B30B 3/04
[52] U.S. Cl. ................................. 100/168; 100/47; 100/170; 72/243; 264/175; 384/99; 384/581; 425/367
[58] Field of Search ........................ 100/170, 168, 47; 425/367; 264/175; 72/245, 243; 384/99, 581, 535

[56] References Cited

U.S. PATENT DOCUMENTS

| | | | |
|---|---|---|---|
| 2,858,173 | 10/1958 | Leibach | 384/99 |
| 2,897,538 | 8/1959 | Shapiro et al. | 100/170 |
| 2,992,866 | 7/1961 | Cavalieri | 384/99 |
| 3,347,157 | 10/1967 | Kemp . | |
| 3,448,683 | 6/1969 | Seanor et al. | 100/170 |
| 3,499,957 | 3/1970 | Ancker et al. . | |
| 3,936,258 | 2/1976 | Lake | 425/367 X |
| 4,620,477 | 11/1986 | Ripani et al. | 100/170 X |

Primary Examiner—James Kee Chi
Attorney, Agent, or Firm—Schwartz, Jeffery, Schwaab, Mack, Blumenthal & Evans

[57] ABSTRACT

An apparatus for the clearance-free mounting of at least one of the rollers in the support column of a calender. The mounting is for producing plastics material films achieved by means of a roller bearing which is divided into three, a central section or ring and two laterally outer sections or rings in a direction transverse to the major axis of the roller journalled to rotate therein. Each bearing ring or section comprises an inner ring portion, at least one row of cylinder rollers, an outer ring portion and a bearing body portion. Pressure applicator means are provided for displacing the central section relative to the two laterally outer sections or rings in a direction towards and away from the roller journalled therein so as to eliminate play within the bearing. To eliminate the play between the bearing body and the calender support column, an additional pressure applicator means is provided which is incorporated in the calender support column.

6 Claims, 5 Drawing Figures

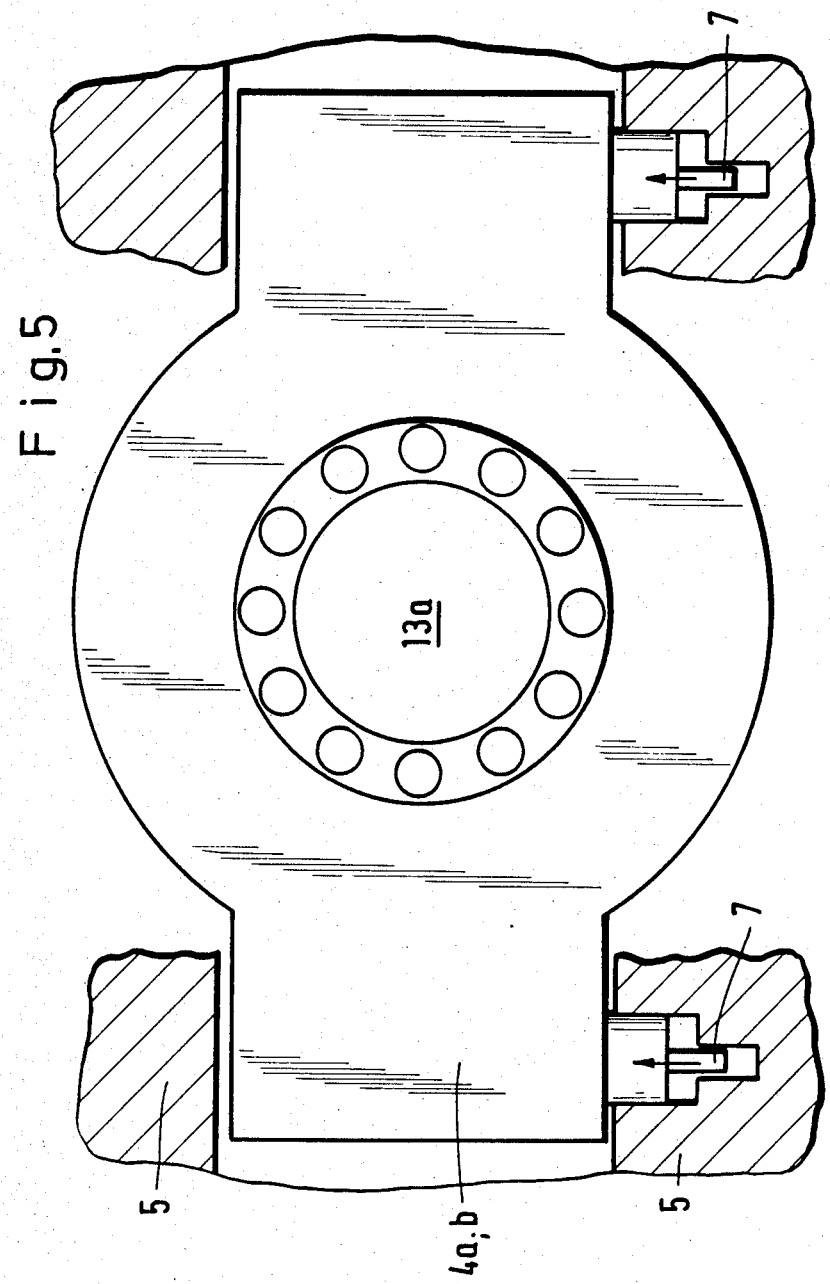

CALENDER ROLLER MOUNTING ARRANGEMENT

FIELD OF THE INVENTION

The present invention relates to a calender roller mounting arrangement and, more particularly, to an apparatus for the clearance-free mounting of at least one of the rollers in a multiple-roller calender used, for example, in the production of plastics material films.

BACKGROUND OF THE INVENTION AND PRIOR ART DISCUSSION

Multiple-roller calenders are known and are used for the production of plastics material films. It is very important for the penultimate roller traversed by the plastics material to be mounted in the calender support column in a clearance-free manner. More especially, it must be ensured that counter-bending devices normally used in such calenders, and also the separating forces produced by the material being calendered, have as little effect as possible on the bending of the penultimate roller. For accurate calendering, the penultimate roller must be retained accurately in its desired position in the calender support columns.

A calender of this general type is disclosed in U.S. Pat. No. 3,347,157. Such calender includes a roller bearing arrangement comprising a friction bearing formed from two half shells, one portion of which can be acted upon by hydraulically-actuated means in order to make the bearing itself clearance-free.

The above-described arrangement is not entirely satisfactory because there are numerous disadvantages associated therewith. The greatest disadvantage resides in the fact that it is impossible to achieve uniform absorption of forces in the split bearing ring.

If relatively strong forces are applied to the half-shells in order to compensate for play in the bearing, a considerable braking effect is exerted upon the roller journals and hence upon the inner bearing ring. Consequently, these bearing components become subject to considerable wear phenomena. As the wear sustained by the curved bearing component increases, it loses its original shape, with the result that the forces are non-uniformly transmitted. This, in turn, leads to the wear phenomena being further increased.

In addition, the provision of the hydraulically-actuated cylinders is disadvantageous in itself. Such hydraulically-actuated cylinders occupy a relatively large volume and hinder the operator of the calendering device. In order to overcome this problem, suitable covers therefor must be provided which occupy additional space and are expensive.

OBJECTS OF THE INVENTION

The present invention seeks to provide a calender roller mounting apparatus by means of which the bearing play of at least one of the rollers in a multiple roller calender is substantially eliminated. In other words, the invention seeks to provide an apparatus which will retain the penultimate roller in an absolutely axis-parallel position and ensures that the forces applied by supplementary means provided to compensate for the bending of the rollers adjacent thereto are always restricted solely to such rollers and do not affect the penultimate roller.

SUMMARY OF THE INVENTION

According to the present invention, there is provided a calender roller mounting arrangement for the clearance-free mounting of at least one of the rollers of a multiple roller calender utilised for the production of plastics material films, the rollers being mounted in a support column, the arrangement including a roller bearing, the bearing comprising an inner ring portion, a plurality of rows of cylinder rollers, an outer ring portion and a bearing body, the roller bearing in which the horizontally disposed calender roller is journalled to rotate being divided, in a direction transverse to the major axis of the roller, into a central section and two laterally outer sections disposed one on each side of the central section, the central section being displaceable relative to the outer sections in a direction towards and away from the calender roller by pressure applicator means, the pressure applicator means being disposed within the bearing body and further pressure applicator means being provided for absorbing the play between the bearing body and the calender support column, which further pressure applicator means are disposed in the calender support column.

The provision of a roller bearing having a plurality of rows of cylinder rollers and which is divided into a central section and two lateral sections in a direction which is transverse to the major axis of the calender journalled to rotate therein shows advantages compared with a friction bearing which is divided in a direction parallel to the major axis of the calender roller. This is because the bearing arrangement of the present invention uniformly absorbs the forces which must be applied to achieve a clearance-free mounting.

The central cylinder roller section or ring ensures that the forces are distributed over the bearing journal in a very uniform and wear-free manner. If pressure is applied to the central section or ring in, for example, an upward direction, the two outer or lateral rings or sections of the bearing are subjected to a force component in a downward direction. Accordingly, the roller journal rotates in the bearing in a play-free manner and the penultimate roller of the calender is thus retained exactly in its desired position. The play within the bearing is thus eliminated.

It must be emphasized that, even with variable pressures being applied to the central ring or section a uniform zero tolerance is always maintained within the bearing rings or sections. This is not so in the case of the arrangement described in the aforementioned U.S. Patent Specification. This is because, in such known arrangement, a reduction in the pressure applied to the half-shell leads to a smaller bearing tolerance, that is to say, a smaller bearing play, being set. Variable tolerances are consequently achieved in dependence upon the pressure applied, with the result that the roller journal may also be free to adopt variable positions within the bearing.

To illustrate the importance of even minimum tolerances of the bearings and of the entire calender, it is pointed out that plastics material calenders produce, for example, polyvinyl chloride films which have a thickness of $40\mu$. The thickness tolerances of the calendered films is $\pm 2.5\mu$ which must be maintained over a web width which may be as great as 2,600 mm.

To provide a free working area in the vicinity of the bearing bodies, the pressure applicator means or tensioning members for the central cylinder roller ring or section are disposed in the bearing housing.

To eliminate the play between the bearing body and the calender support column whilst simultaneously providing a simple and neat arrangement, the further pressure applicators or pretensioning members which engage with the bearing body are incorporated in the calender support column.

In a preferred embodiment of the invention, four rows of cylinder rollers are provided.

BRIEF DESCRIPTION OF THE DRAWINGS

One preferred embodiment of an apparatus in accordance with the present invention will be further described, by way of example, with reference to the accompanying drawings, in which:

FIG. 5 is a cross-sectional view taken along the line V—V of FIG. 3.

DESCRIPTION OF PREFERRED EMBODIMENT

Figure 1:
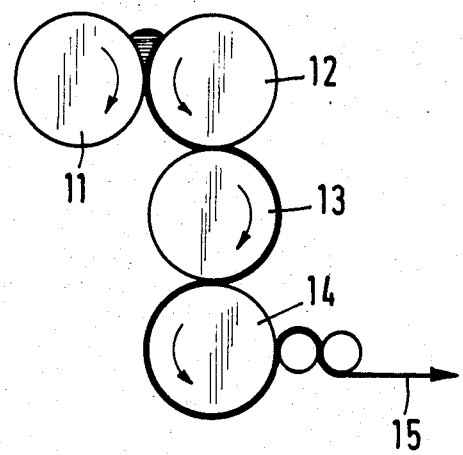
FIG. 1 shows a schematic sectional view through a four-roller calender taken along the line I—I of FIG. 2.
Figure 2:
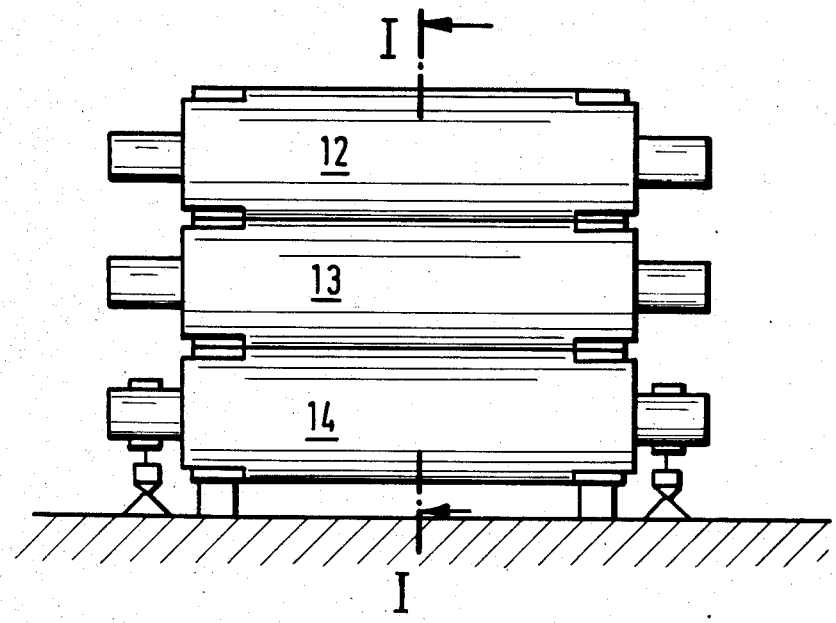
FIG. 2 is a front view of the four-roller calender shown in FIG. 1.

In FIG. 1 there is shown a calender which comprises four rollers 11, 12, 13 and 14 schematically illustrated in cross-section. The material to be calendered, such as polyvinyl chloride, is inserted into the gap between the two upper rollers 11 and 12. Subsequently, the material passes through the roller gaps between the roller pairs 12 and 13 and 13 and 14, thereby forming a so-called rolling sheet on each occasion. The material is removed from the lowermost roller 14 in the form of a film 15.

The roller 13, that is to say, the penultimate roller of the calender, must be retained in a true axis-parallel position, so that supplementary means (not shown) which compensate for the bending of the calender roller—caused by the rolling sheets of material and by the inherent weight of the roller—can be effectively used. It must be ensured that these supplementary means which compensate for the bending of the two rollers 12 and 14 on either side of the penultimate roller act solely on such rollers 12 and 14 and do not affect the penultimate roller 13.

To achieve this, the present invention provides a roller mounting apparatus including a bearing arrangement for the penultimate roller. Such bearing arrangement will now be described with reference to FIGS. 3-5. Cylinder roller bearings are disposed at each end of the roller 13. The roller 13 includes journalled end regions 13a which rotate within a radially inner ring 1 of the bearing. The ring 1, which may be continuous or divided, accommodates rollers 2, shown specifically in FIG. 3 as rows 2a, 2b, 2c and 2d of cylinder rollers.

The rows of cylinder rollers are located between the inner ring 1 and a divided radially outer ring. The outer ring of rollers 3, shown more specifically in FIG. 3 as ring portions 3a, 3b and 3c portion 3a covers the roller row 2a, portion 3c covers the roller row 2d and portion 3b covers roller ring 2b and 2c. The divided outer ring of the bearing is covered by a correspondingly divided bearing body. The central portion 4 of the bearing body covers outer ring portion 3b and the lateral portions 4a and 4b cover the outer ring portions 3a and 3b respectively.

Figure 4:
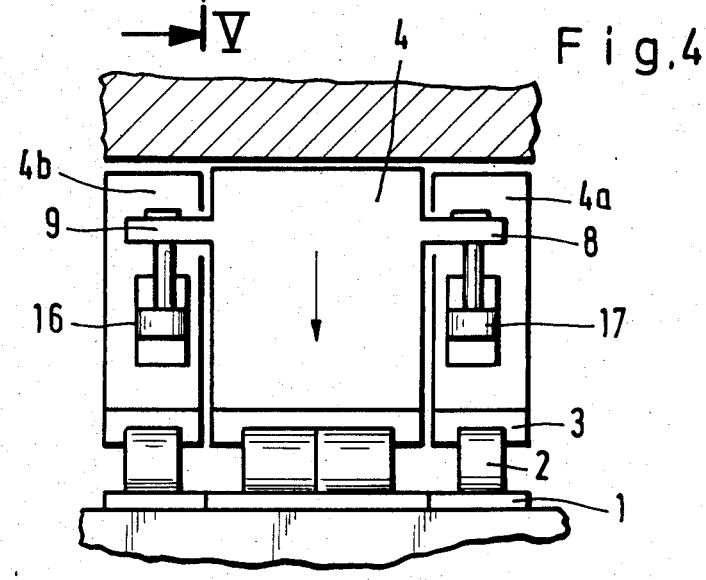
FIG. 4 is a longitudinal sectional view of the detail ringed at Z in FIG. 3.

The central bearing body portion 4 is provided with laterally extending arms 8 and 9 which engage with the piston rods of double-acting hydraulic piston and cylinder arrangements 17 and 16 respectively. These piston and cylinder arrangements may, as shown in FIG. 4, be disposed in the lateral bearing body portions 4a and 4b respectively.

Actuation of the double-acting hydraulic piston and cylinder arrangements 16 and 17 cause the main bearing body 4 to be moved either radially outwardly so as to relieve the rows of cylinder rollers 2b and 2c or radially inwardly so as to press them towards the rows of rollers. By pressing the central bearing body portion 4 towards the rows of cylinder rollers 2b and 2c, the bearing play between the inner ring 1, the rows of cylinder rollers 2a, 2b, 2c and 2d, the central bearing body portion 4 and the lateral secondary bearing body portions 4a and 4b is eliminated.

Figure 3:
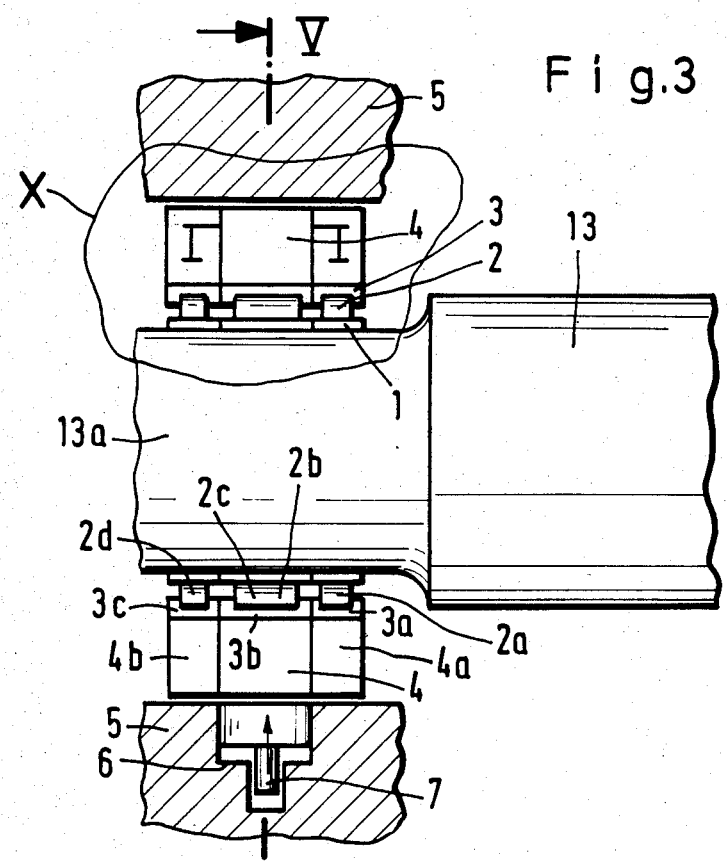
FIG. 3 is a longitudinal sectional view taken through one end of the penultimate roller of the calender shown in FIGS. 1 and 2 and of the bearing therefor.

To eliminate the play between the bearing body portions 4, 4a, and 4b and a calender support column 5 in which the rollers 11, 12, 13 and 14 are mounted, pressure application devices such as hydraulic piston and cylinder arrangements 7 or pre-tensioned springs are provided which act on the central bearing body portion 4. In FIG. 3, the piston and cylinder arrangement 7 is located in recess 6 formed in the support column 5. The roller 13 thus has no mechanical free play and is, therefore, retained exactly in its desired position.

By disposing the hydraulic piston and cylinder arrangements 16 and 17 used for eliminating the play within the bearing in the lateral bearing body portions 4a and 4b, and by disposing the hydraulic piston and cylinder arrangements 7 in the calender support column 5, a neat space-saving arrangement is achieved. This is particularly apparent when such arrangement is compared with that disclosed in U.S. Pat. No. 3,347,157.

I claim:

1. A calender roller mounting arrangement for mounting the rollers in a multiple-roller calender for producing films of plastic material, said calender having a support column for mounting and supporting said rollers, said arrangement providing for the clearance-free mounting of at least one of the rollers, said end roller having end portions, said arrangement for each end portion of said one roller comprising:

(a) bearing means in which said end portions are journalled to rotate, said bearing means comprising:
   (i) an inner ring receiving said journalled end portion,
   (ii) a plurality of rings of axially spaced cylinder rollers located radially outwardly of and engaging said inner ring,
   (iii) an outer ring comprised of axially spaced center and outer ring portions engaging the radially outer surfaces of corresponding cylinder rollers, and
   (iv) a bearing body located radially outwardly of and in engagement with said outer ring portions, and radially inwardly of said support column, said bearing body being comprised of a central section and two separate laterally outer sections disposed on each side of said central section, said central section engaging the center ring portion of said outer ring, and being aligned with the centralmost cylinder rollers and the center of said inner ring;
(b) first pressure application means mounted within said bearing body and acting on said central section to permit radial displacement thereof, relative to the laterally outer sections of said body, toward and away from the axis of said one roll, and
(c) second pressure application means disposed within said support column for absorbing the play between said bearing body and said support column.

2. An apparatus as recited in claim 1, in which four rows of said cylinder rollers are provided.

3. An apparatus as recited in claim 2, in which two rows of said cylindrical rollers comprise a central section of said rollers, and one row of said cylinder rollers on either side of said central roller section form outer sections, pressure being applied to said central roller section by said central section of said bearing body.

4. An apparatus as recited in claim 1 in which said first pressure applicator means comprises hydraulic piston and cylinder arrangements.

5. An apparatus as claimed in claim 4, wherein said piston and cylinder arrangements are mounted within said outer sections of said bearing body and interengage laterally extending arms of said central section of said bearing body.

6. An apparatus as recited in claim 1 in which said second pressure applicator means comprises hydraulic piston and cylinder arrangements.

* * * * *